United States Patent
Bracha (10) Patent No.: US 6,687,760 B1
(45) Date of Patent: Feb. 3, 2004

(54) METHOD AND APPARATUS FOR PREFORMING METHOD LOOKUP IN THE PRESENCE OF MODULARITY CONSTRUCTS TO SUPPORT TRANSITIVE METHOD OVERRIDE

(75) Inventor: Gilad Bracha, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/374,485

(22) Filed: Aug. 13, 1999

(51) Int. Cl.[7] .................................................. G06F 9/00
(52) U.S. Cl. ..................................... 709/310; 717/154
(58) Field of Search ......................................... 709/310

(56) References Cited

U.S. PATENT DOCUMENTS

| | | | |
|---|---|---|---|
| 5,327,562 A | | 7/1994 | Adcock |
| 5,404,525 A | | 4/1995 | Endicott et al. |
| 5,632,034 A | * | 5/1997 | O'Farrell .................... 717/140 |
| 5,721,824 A | | 2/1998 | Taylor .................. 395/200.33 |
| 5,913,064 A | * | 6/1999 | Chen ............................ 717/108 |
| 5,918,052 A | | 6/1999 | Kruskal et al. |
| 6,102,966 A | | 8/2000 | Tyma ............................. 717/1 |
| 6,526,571 B1 | * | 2/2003 | Aizikowitz et al. ......... 717/154 |

OTHER PUBLICATIONS

James Gosling et al , Java Language Specification, Sun Microsystem, Inc, 1996.*
The Java Specification(first edition), James Gosling, 1996, Addison–Wesley, Chapter 15.*
Cardelli et al., "Modula–3 Report (revised)," digital Systems Research Center, Nov. 1, 1989.
First Edition of JLS entitled "The Java Language Specification", by James Gosling, Bill Joy & Guy Steele, dated Oct. 3, 2002, (40 pgs), http://java.sun.com/docs/books/jls/first_edition/html/index.html.

* cited by examiner

Primary Examiner—John Follansbee
Assistant Examiner—Lechi Truong
(74) Attorney, Agent, or Firm—Hickman Palermo Truong & Becker LLP; Christian A. Nicholes; Bobby K. Truong (57) ABSTRACT

A method lookup mechanism is disclosed which not only enforces accessibility constraints imposed by modularity constructs but also enables transitive method override. According to one embodiment, when a method m is invoked on a target object, the resolved method m in a resolved class is checked to determine whether it has been declared as public/protected. If so, then standard method lookup may be used to determine the proper implementation of method m to invoke. However, if the resolved method is not declared as public/protected, then a path stack is constructed. The path stack provides a listing of the class hierarchy between the target object and the resolved class. Once constructed, the path stack is used to determine which implementation of method m to invoke in response to the method invocation. Specifically, the resolved method m is initially set as the candidate method to invoke. Then a downward search is performed through the classes on the path stack. At each class on the path stack, a determination is made as to whether that class: (1) provides an implementation for the method m; (2) can access the resolved method; and (3) has declared the method m as public/protected. If so, then the proper implementation for method m to be invoked may be determined using standard method lookup. However, if a class satisfies only the first two criteria, then the method m for that class is made the new candidate method, and the process loops back to test the next class on the path stack. This loop continues until either a class is found which satisfies all three criteria, in which case standard method lookup is used to invoke the proper implementation for method m, or until all of the classes on the path stack have been tested, in which case the last detected candidate method is invoked.

30 Claims, 6 Drawing Sheets

PATH STACK

METHOD AND APPARATUS FOR PREFORMING METHOD LOOKUP IN THE PRESENCE OF MODULARITY CONSTRUCTS TO SUPPORT TRANSITIVE METHOD OVERRIDE

BACKGROUND

This invention relates generally to computer systems and more particularly to a method and apparatus for performing method lookup to support transitive method override in the presence of modularity constructs, such as packages.

Inheritance is a major property of most object oriented programming systems. With inheritance, when a class is declared as a subclass of a superclass, that subclass automatically inherits all of the methods and attributes of the superclass. Thus, if class A has method M1 and attribute AT1, then class B, which is a subclass of class A, automatically inherits method M1 and attribute AT1. In addition to inheriting the methods and attributes of the superclass, the subclass may further comprise additional methods and attributes. Thus, for the example given above, class B may further comprise methods M2 and M3, and attributes AT2 and AT3.

In addition to inheriting and adding methods and attributes, some object oriented systems further allow subclasses to override the methods of the superclass. That is, the subclass is allowed to provide an implementation for an inherited method which is different from that provided by the superclass. This means that, for the example given above, subclass B may provide a different implementation for method M1 than that provided by superclass A. For example, the implementation for M1 provided by superclass A may draw a square whereas the implementation for method M1 provided by subclass B draws a circle. Thus, even though both methods have the same name, they may have different implementations. Which implementation is invoked depends upon the class of the object instance on which the method is invoked. If the method is invoked on a class A instance, then the implementation provided by class A will be invoked. If the method is invoked on a class B instance, then the implementation provided by class B will be invoked. Because there may be multiple implementations for any particular method, a determination will have to be made at runtime as to which implementation to invoke. The process of selecting which implementation to invoke at runtime is referred to as dynamic method dispatch.

In single inheritance systems where every subclass is able to access, and hence, override every method of a higher level class, the dynamic method dispatch process is relatively straightforward. However, some systems, such as the Java™ programming system manufactured by Sun Microsystems, Inc. of Mountain View, Calif., implement constructs known as "modularity constructs" which make it possible for a developer to restrict the accessibility of certain methods of certain classes to other classes. In the face of these accessibility restrictions, dynamic method dispatch is made much more complicated.

Figure 1:
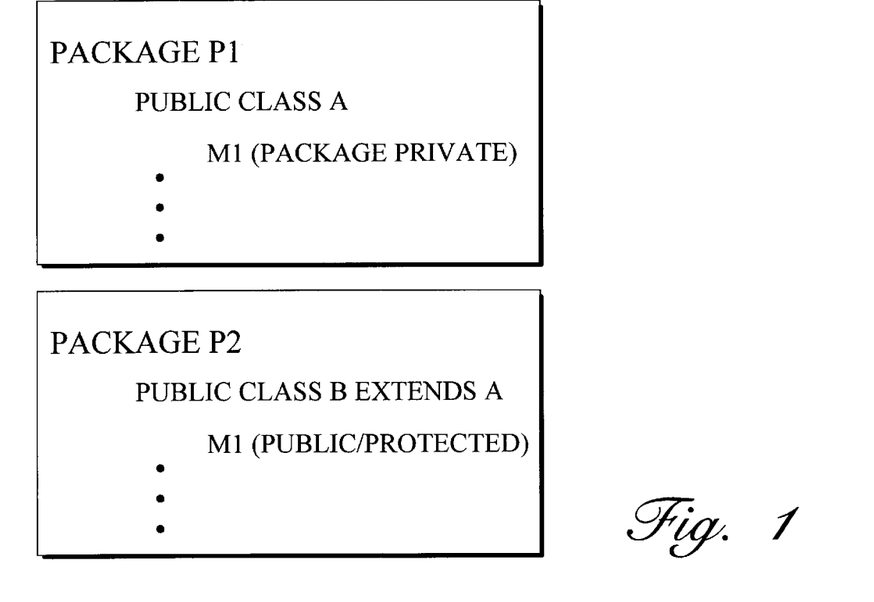
FIG. 1 is a diagram of two classes within two packages to illustrate the accessibility constraints that may be imposed by modularity constructs.

To elaborate, a modularity construct, sometimes referred to as a "package" in Java™, provides a mechanism for grouping or encapsulating selected classes. The package construct makes it possible to limit access to the classes within a package by classes in other packages. More specifically, each method of each class within a package may be declared as "public", "protected", or "package private". If a method is declared public or protected (denoted as public/protected hereinafter), then it may be accessed, and hence overridden, by any subclass of that class. On the other hand, if a method is declared package private, then that method may be accessed and overridden by a subclass if and only if that subclass is within the same package. Subclasses outside the package may not access or override the method. FIG. 1 illustrates an example of such a situation. In FIG. 1, there is shown two packages, P1 and P2. Package P1 contains a class A having a package private method M1. Package P2 contains a class B which extends A (meaning that B is a subclass of A) having a public/protected method M1. Because method M1 of class A is declared package private, and because class B is not in the same package as class A, class B will not be able to access or to override the method M1 of class A. Note that the package construct does not prevent class B from being a subclass of A, and hence, inheriting all of the attributes and methods of class A. The package only prevents class B from overriding the method M1 of class A. To enforce package constraints, it is a general rule that unless a subclass is within the same package as a higher level class that it wishes to override, it cannot override a package private method of the higher level class.

Figure 2:
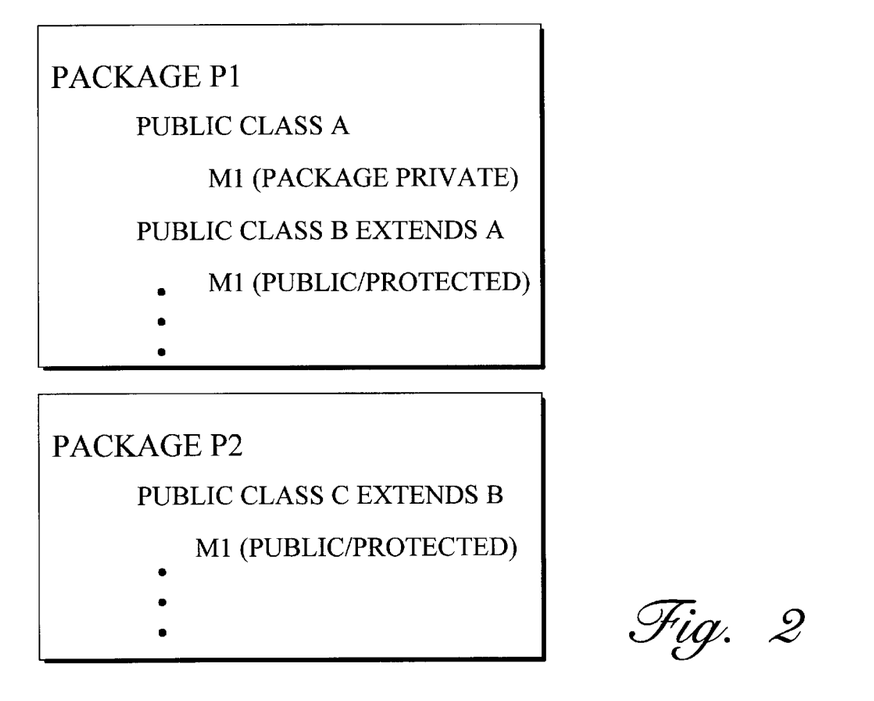
FIG. 2 is a diagram of three classes within two packages to illustrate how enforcement of modularity constraints may cause method override to be non-transitive.

While on the surface, this general rule appears to effectively enforce the accessibility constraints imposed by modularity constructs, it can lead to some undesirable results, one of which is that of non-transitive method override. To illustrate how this non-transitive result can arise, suppose that a structure such as that shown in FIG. 2 is created, wherein there are two packages, P1 and P2. In package P1, there is a class A having a package private method M1. In the same package, there is a subclass B which extends A, having a public/protected method M1. In package P2, there is a subclass C which extends B, and which has a public/protected method M1. With such a structure, it is clear that method M1 of subclass B can access and hence override method M1 of class A (since B is in the same package as A). It is also clear that method M1 of class C can override the method M1 of class B (since method M1 of B is declared to be public/protected). According to the transitive property, if method M1 of C can override method M1 of B, and method M1 of B can override method M1 of A, then method M1 of C should be able to override method M1 of A. This is not the result in this example, however, because under the rule set forth above, M1 of C cannot override M1 of A because M1 of A is package private and C is not in the same package as A. Thus, as this example shows, strict adherence to this rule can lead to non-transitive results. Because this is a somewhat non-intuitive result, and because transitive method override is a desirable property, there is a need for an improved dynamic method dispatch mechanism which is both capable of enforcing the accessibility constraints of modular constructs and providing transitive method override.

SUMMARY OF THE INVENTION

One mechanism that may be used to perform dynamic method dispatch is a method lookup mechanism. In the present invention, there is provided an improved method lookup mechanism which not only enforces accessibility constraints imposed by modularity constructs but also enables transitive method override.

According to one embodiment of the present invention, when a method m is invoked on a target object, the resolved method m in a resolved class is checked to determine whether it has been declared as public/protected. If so, then standard method lookup may be used to determine the proper implementation of method m to invoke. However, if the resolved method is not declared as public/protected, then a path stack is constructed. The path stack provides a listing of the class hierarchy between the target object and the resolved class.

Once constructed, the path stack is used to determine which implementation of method m to invoke in response to the method invocation. Specifically, the resolved method m is initially set as the candidate method to invoke. Then a downward search is performed through the classes on the path stack. At each class on the path stack, a determination is made as to whether that class: (1) provides an implementation for the method m; (2) can access the resolved method; and (3) has declared the method m as public/protected. If so, then the proper implementation for method m to be invoked may be determined using standard method lookup. However, if a class satisfies only the first two criteria, then the implementation for method m provided by that class is made the new candidate method, and the process loops back to test the next class on the path stack, This loop continues until either a class is found which satisfies all three criteria, in which case standard method lookup is used to invoke the proper implementation for method m, or until all of the classes on the path stack have been tested, in which case the last detected candidate method is invoked. Performing method lookup in this manner will enable accessibility constraints imposed by modularity constructs to be enforced while at the same time enabling method override to be transitive. dr

DETAILED DESCRIPTION OF THE EMBODIMENT(S)

Method lookup is one of the mechanisms that may be used to perform dynamic method dispatch. In the present invention, there is provided an improved method lookup mechanism which enables transitive method override while enforcing accessibility constraints imposed by modularity constructs. Before describing the method lookup mechanism of the present invention in detail, however, a brief discussion of method lookup in general will be provided in order to facilitate a complete understanding of the invention.

Basically, method lookup refers to the process, performed at runtime, of navigating through a class hierarchy to determine which method implementation to invoke in response to a method invocation. To fully discuss the topic of method lookup, several concepts need to be introduced. These concepts include the notion of a "resolved class", a "resolved method", and a "target object". These are best understood with reference to an example.

Suppose that the following statement appears in a set of source code written in a statically-typed language:

Foo (A a) {a.m( )}

This statement declares that there is a function Foo which invokes a method m on an object of type (i.e. class) A. When the symbolic references of this statement are "resolved", which may take place at compile time or at link time (the Java™ programming system resolves at link time), a check is made to verify that there is indeed a method m defined in class A. If there is, then for purposes of function Foo, class A becomes the resolved class and method m of class A becomes the resolved method. Basically, the resolved class is the class in which there is guaranteed (unless an error has occurred) to be an implementation for the method m. As will be discussed below, this implementation for method m may not necessarily be the one that is invoked when Foo is executed, but it is one possible implementation. In effect, the resolved method may be viewed as the default implementation for method m. At this point, it should be noted that resolution of symbolic references typically takes place only once, at resolution time. It is not carried out each time the function Foo is executed.

As is clear from its declaration, Function Foo may be invoked on any object instance of class A. In addition, Foo may also be invoked on any object instance of any subclass of A. For example, if B is a subclass of A, and C is a subclass of B, then Foo may be invoked on an instance of class B, and an instance of class C. This makes sense since B and C, being subclasses of A, are technically of type A. The object instance on which Foo is invoked is referred to as the target object. Thus, if object T is an instance of class C, and function Foo is invoked on object T (denoted as Foo(T)), then object T is the target object.

When Foo is invoked on a target object, what is really taking place is that the method m of the class of the target object is being invoked. Because inheritance makes it possible for each subclass to override a method of a higher level class (i.e. to provide a different implementation for the method), the actual implementation of method m that is invoked may depend upon the class of the target object. To illustrate this point, suppose that there exists a class hierarchy such as that shown in FIG. 3, wherein there is a class B 304, having a superclass A 302 and a subclass C 306. Suppose further that for a function Foo, the resolved class is class A 302 and the resolved method is method m of class A 302. In addition, suppose that each class provides a different implementation for method m, with class A 302 providing implementation m(1), class B 304 providing implementation m(2), and class C 306 providing implementation m(3). Assuming that all of the subclasses can access and override all of the methods of the higher level classes, the implementation of method m that is invoked when function Foo is invoked on a target object will depend upon the class of the target object.

Figure 3:
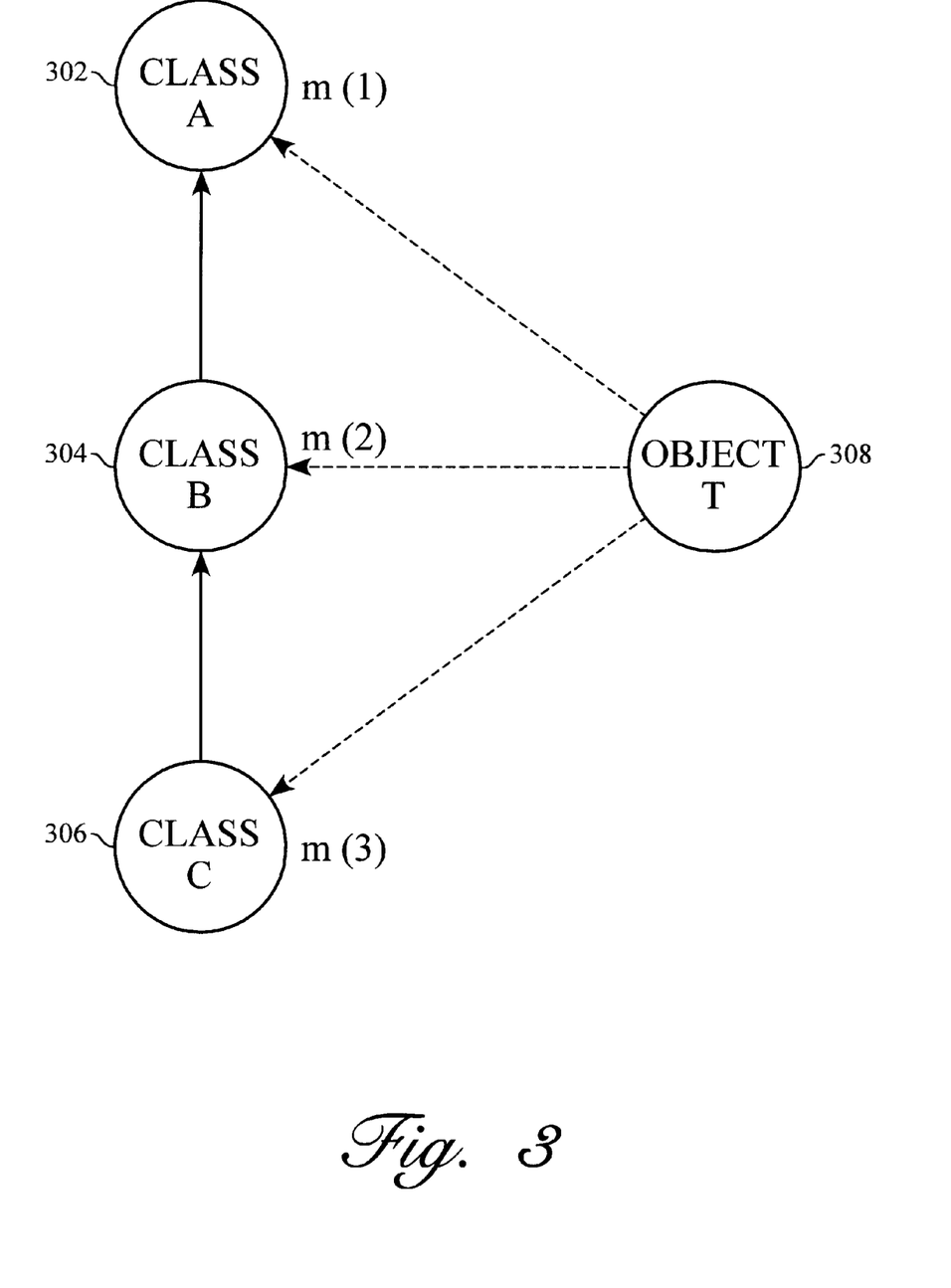
FIG. 3 is a diagram of a sample class hierarchy to illustrate the manner in which the standard method lookup methodology carries out dynamic method dispatch.

For example, if target object T 308 is an instance of class C 306, then implementation m(3) of method m will be invoked when Foo is executed. On the other hand, if the target object T 308 is an instance of class B 304, then implementation m(2) of method m will be invoked. As this discussion shows, even though class A is the resolved class and method m of class A 302 is the resolved method, the implementation for method m that is actually invoked at runtime may not (and often is not) the implementation m(1) provided by the resolved class.

One methodology that has been used to perform dynamic method dispatch is that of standard method lookup. This methodology will be described with reference to the sample hierarchy shown in FIG. 3. According to standard method lookup, when a method m is invoked on a target object of a certain class (class C 306, for example), that class 306 is checked for an implementation of the method m. If an implementation is found, as is the case in this example, then that method implementation m(3) is invoked. Otherwise, the superclass 304 of the current class 306 is checked for an implementation of the method m. If an implementation is found in the superclass, then that method implementation m(2) is invoked. Otherwise, the next superclass 302 is checked. This process continues until an implementation is found and invoked or the resolved class 302 is reached. If the resolved class 302 is reached, then the resolved method implementation m(1) will be invoked.

The standard method lookup methodology is based upon the assumption that each subclass can access and override each method of its superclass. Because it is based upon this assumption, it cannot handle the accessibility limits imposed by modularity constructs, and because it cannot handle modularity constructs, it cannot enable transitive method override in the face of such constructs. The present invention provides a method lookup mechanism which addresses and solves all of these problems.

Figure 4:
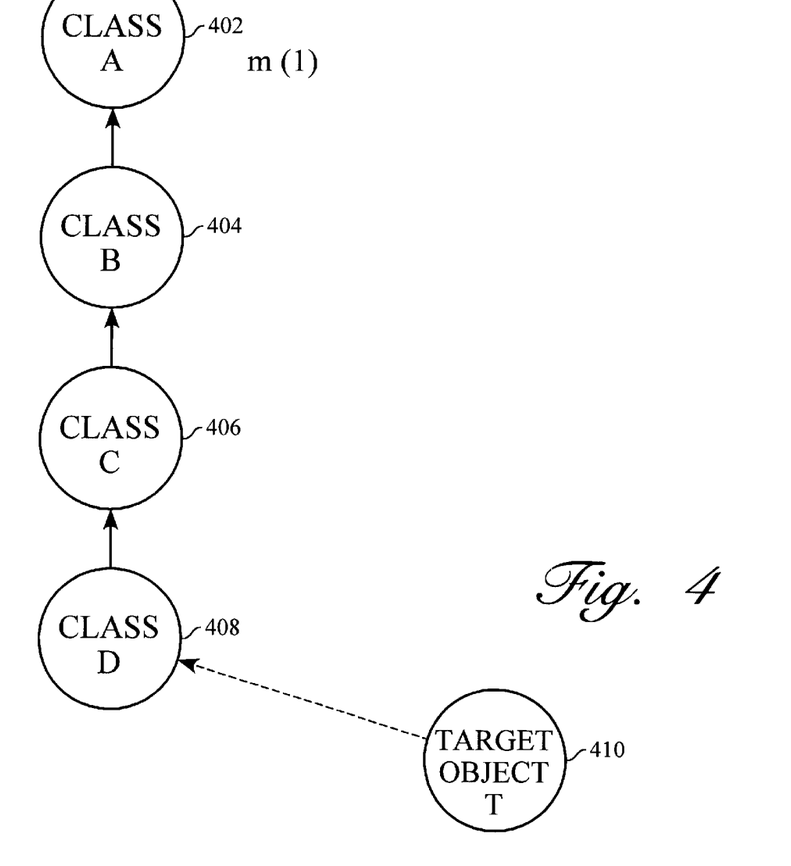
FIG. 4 is a diagram of a sample class hierarchy for use in facilitating description of the present invention.
Figure 5:
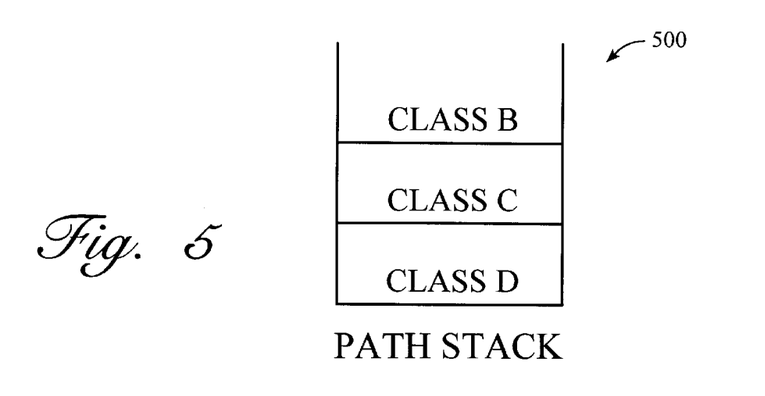
FIG. 5 is a diagram of a sample path stack for the class hierarchy shown in FIG. 4 to facilitate description of the present invention.
Figure 6A:
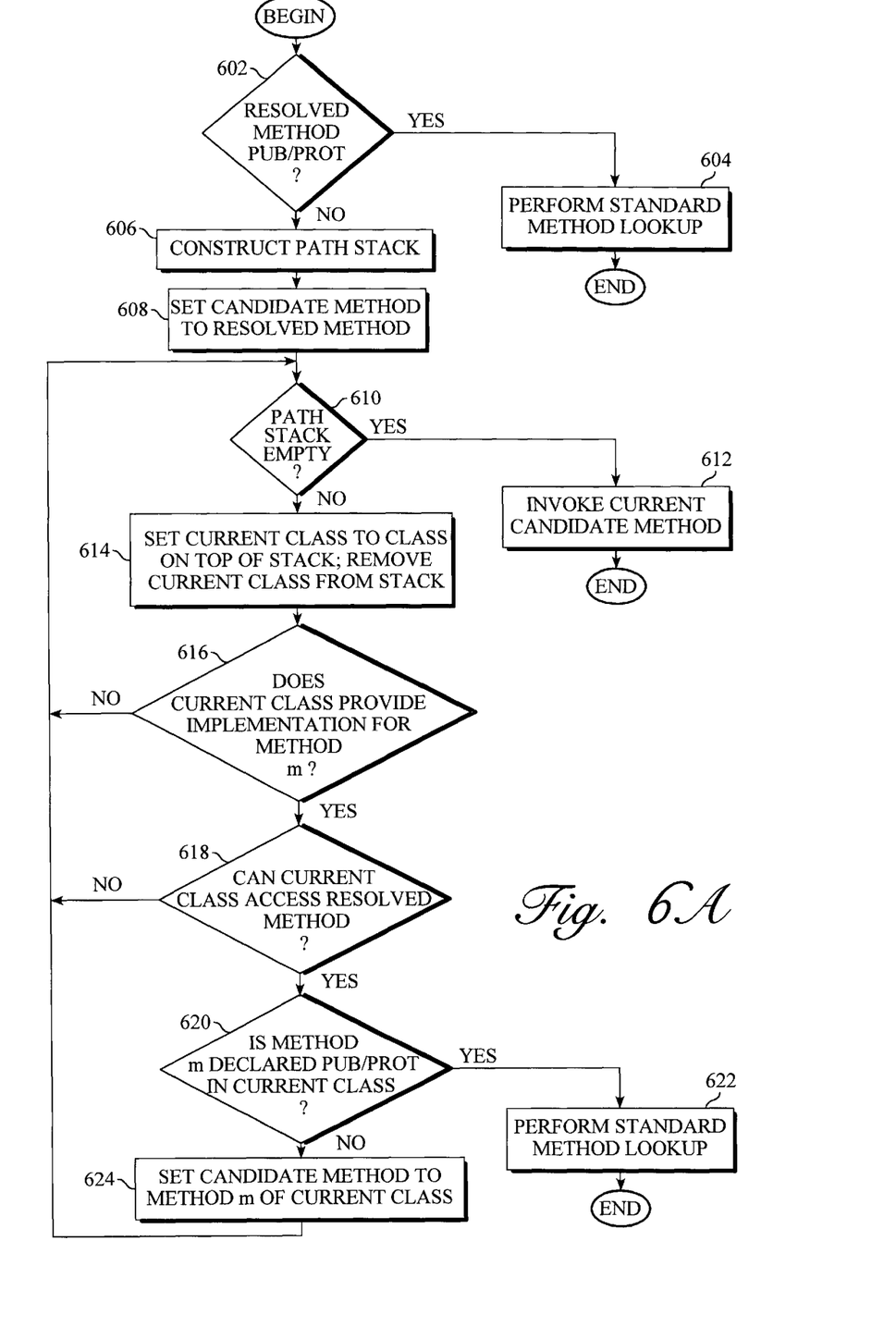
FIGS. 6a–6b are flow diagrams for the method of the present invention.
Figure 6B:
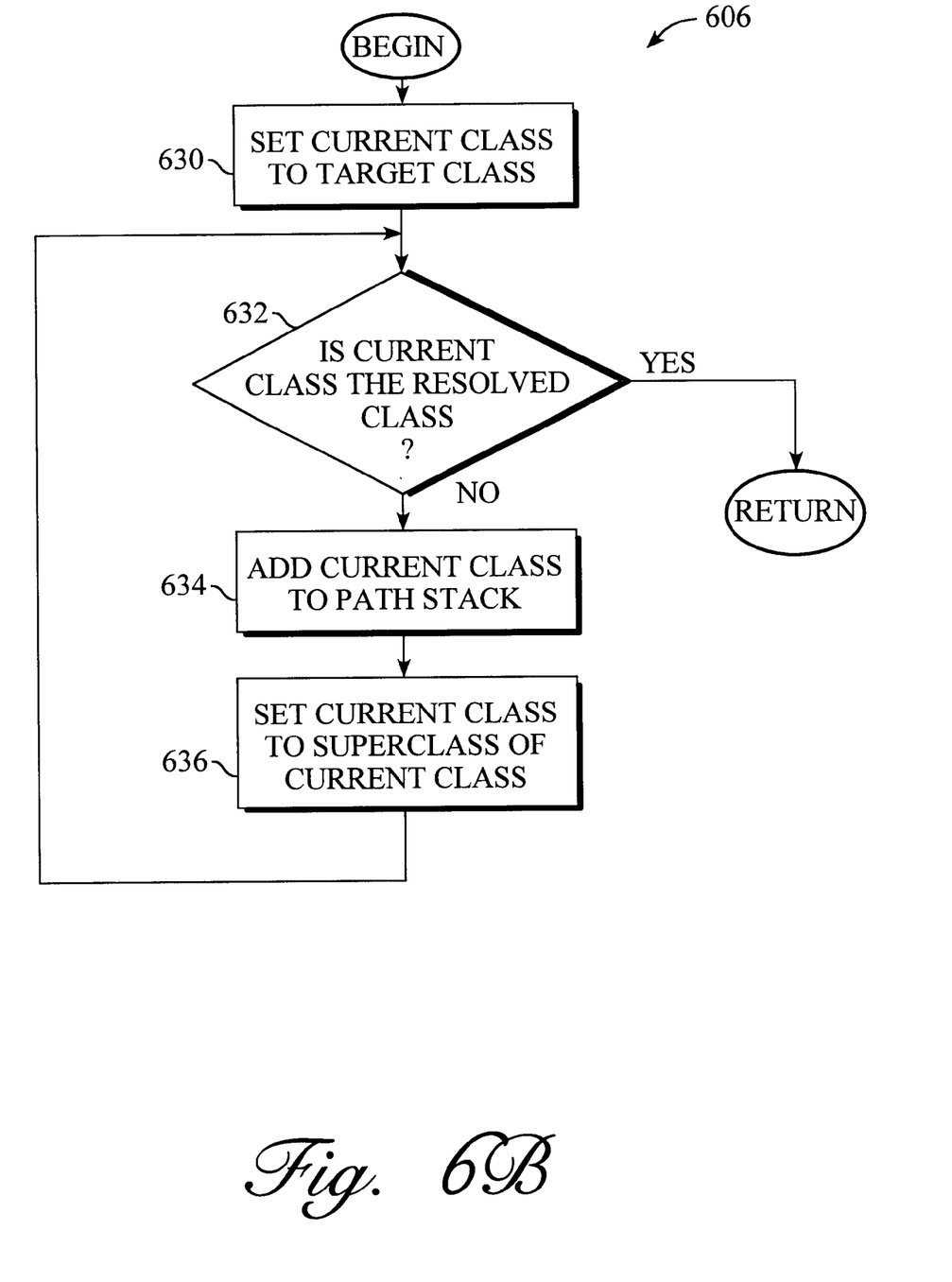

With reference to FIGS. 4, 5 and 6a–6b, the present invention will now be described in detail. FIG. 4 shows a sample class hierarchy which will be used to facilitate the description of the invention. FIG. 5 shows a sample path stack for the class hierarchy of FIG. 4, and FIGS. 6a–6b are the flow diagrams for the methodology of the present invention. The following description will be based upon the following assumptions: (1) the resolved class is class A 402 which is part of a package P; (2) the resolved method is method m of class A 402 having a resolved method implementation m(1); (3) the target object is object T 410; and (4) the method invocation is on method m of target object T 410.

As shown in FIG. 6a, the lookup method of the present invention begins by determining (602) whether the resolved method (method m of class A 402) has been marked as public/protected. If it has, then it can be accessed and overridden by all subsequent subclasses. If that is the case, then the standard method lookup procedure discussed above may be used to perform (604) the method dispatch. Namely, the class 408 of the target object T 410 is searched for an implementation of the method m. If an implementation is found, then it is invoked. Otherwise, the next superclass 406 is searched for an implementation of method m. If an implementation is found in the superclass 406, then that implementation is invoked. Otherwise, the next superclass 404 is searched. This process continues until either an implementation for method m is found and invoked in one of the subclasses 404, 406, 408, or the resolved class 402 is reached, in which case the resolved method implementation m(1) is invoked.

Returning to (602), if the resolved method is not marked public/protected, then it is private to package P. This is known because if the resolved method were private to another package or private altogether, then it would have failed to link, in which case, it would not have even gotten to the point of execution. If the resolved method is private to package P, then a more involved process will be used to determine which implementation of method m to invoke. This process begins with constructing (606) a path stack. A path stack is constructed as shown in FIG. 6b, wherein a current class variable is initially set (630) to the class of the target object 410 (FIG. 4). In this example, target object 410 is of class D 408; thus, the current class variable is initialized to class D 408. Then, a determination (632) is made as to whether the current class is the resolved class (class A 402). If so, then the stack construction process is completed and the process returns to (606) of FIG. 5a. However, if the current class is not the resolved class, then the current class is added (634) to the path stack. Thereafter, the current class variable is set (636) to the superclass of the current class, and the process loops back to (632). This process of adding the current class to the stack and moving up to the next superclass continues until the resolved class is reached. By going from the class of the target object 410 up to the resolved class 402 in the manner described, the path stack construction process generates a listing of the class hierarchy between the target object 410 and the resolved class 402.

With reference to FIG. 5, there is shown a path stack 500 for the sample class hierarchy shown in FIG. 4. Notice that the stack goes from the bottom up, with each superclass above its subclass. Notice further that the class (class D 408) of the target object 410 is included at the bottom of the path stack 500, but that the resolved class 402 is not included in the stack 500 at all.

Once constructed, the path stack 500 may be used to determine the proper implementation of method m to invoke in response to the method invocation. The proper implementation is invoked as follows. Initially, a candidate method variable is set (608 of FIG. 6a) to the resolved method. The candidate method represents the implementation for method m that will be invoked unless an overriding method is found. By initializing the candidate method to the resolved method, the resolved method implementation m(1) provided by the resolved class 402 is made the default implementation. Unless a valid overriding implementation is found in one of the subclasses 404, 406, 408, the resolved method implementation m(1) for method m will be invoked.

Once the candidate method variable is initialized, a loop is entered. Within this loop, a determination (610) is made as to whether the path stack 500 is currently empty. If so, then it means that all of the subclasses 404, 406, 408 have been checked. In such a case, the current candidate method implementation is invoked (612) and the process is terminated. On the other hand, if the path stack 500 is not empty, then a current class variable is set (614) to the class currently on the top of the stack 500 (class B in the current example), and that class is removed from the stack 500. Then, the current class is checked (616) for an implementation for method m. If the current class does not provide an implementation for method m, then the process loops back to (610) to test the next class (if any) on the stack 500. However, if the current class does provide an implementation for method m, then a determination (618) is made as to whether the current class can directly access the resolved method. This determination is made be checking the package to which the current class belongs. If the current class is in the same package P as the resolved class 402, then it can directly access and hence override the resolved method. In such a case, the process proceeds to (620). Otherwise, the process loops back to (610).

By the time (620) is reached, it is already know that the current class can access and override the resolved method. What remains to be determined is whether the current class has "publicized" the resolved method. If it has, then it means that all subclasses of the current class will be able to access and hence override the resolved method. It is this "publicize" notion that gives rise to the transitive property of the present invention. To publicize the resolved method, all the current class has to do is to declare its implementation of method m public/protected. By doing so, it opens up its implementation of method m to possible override by of all its subclasses, which in turn opens up the resolved method to possible override by all subclasses of the current class. Thus, if it is determined at (620) that the current class has marked its implementation of method m public/protected, then the resolved method can be treated as if it were marked public/protected for purposes of the subclasses of the current class. In such a case, the standard method lookup methodology described previously may be performed (622) to determine the proper implementation for method m to invoke.

Returning to (620), if it is determined that the current class has not declared its implementation for method m public/protected (thereby meaning that it has declared the implementation private to package P), then the candidate method variable is set (624) to the method m implementation of the current class. Even though this implementation has not been declared public/protected, it is still a valid override of the resolved method. Thus, it is set as the candidate method, and it will be invoked unless it is properly overridden by another implementation of method m in a subclass. After the candidate method variable has been updated, the process loops back to (610) to test the next class on the path stack 500. By looping through each class on the path stack in the manner described, the present invention invokes the lowest implementation of method m in the class hierarchy that validly overrides the resolved method.

To illustrate that the present invention does indeed enable transitive method override in the presence of modularity constructs, reference will be made to the example shown in FIG. 2. As discussed previously, under the transitive property, since method M1 of C can override method M1 of B, and method M1 of B can override method M1 of A, method M1 of C should be able to override method M1 of A. This is indeed the result achieved with the present invention.

According to the invention, assuming that the resolved class is class A and the resolved method is method M1 of class A, when the method M1 is invoked on an object instance of class C, a path stack is created (because method M1 of class A is not declared public/protected) comprising class C and class B. Then, the classes on the stack, beginning with class B, are put through a series of tests. First, it is determined whether the current class provides an implementation for the method M1. In the case of class B, there is an implementation provided; thus, the process proceeds to the next determination, which is whether the current class can access the resolved method (method M1 of class A). Since class B is in the same package as class A, class B can access the resolved method; thus, the process proceeds to the next determination, which is whether the method M1 has been declared public/protected in the current class. In the case of class B, the method M1 has been declared public/protected; thus, according to the present invention, the proper implementation to invoke for method M1 may be determined by performing the standard method lookup procedure.

According to standard method lookup, the class (class C in this example) of the target object instance is searched for an implementation of the method M1. If one is found, then it is invoked. In the example of FIG. 2, class C does provide an implementation for method M1; thus, it is that implementation for M1 that will be invoked. Note that by invoking the implementation for M1 provided by class C, the resolved method M1 of class A is in effect being overridden by the method M1 of class C. This is exactly the desired result under the transitive property. Namely, since method M1 of C can override method M1 of B, and method M1 of B can override method M1 of A, method M1 of C should be able to override method M1 of A. This is indeed the result achieved by the present invention. Thus, the present invention enables transitive method override.

Hardware Overview

Figure 7:
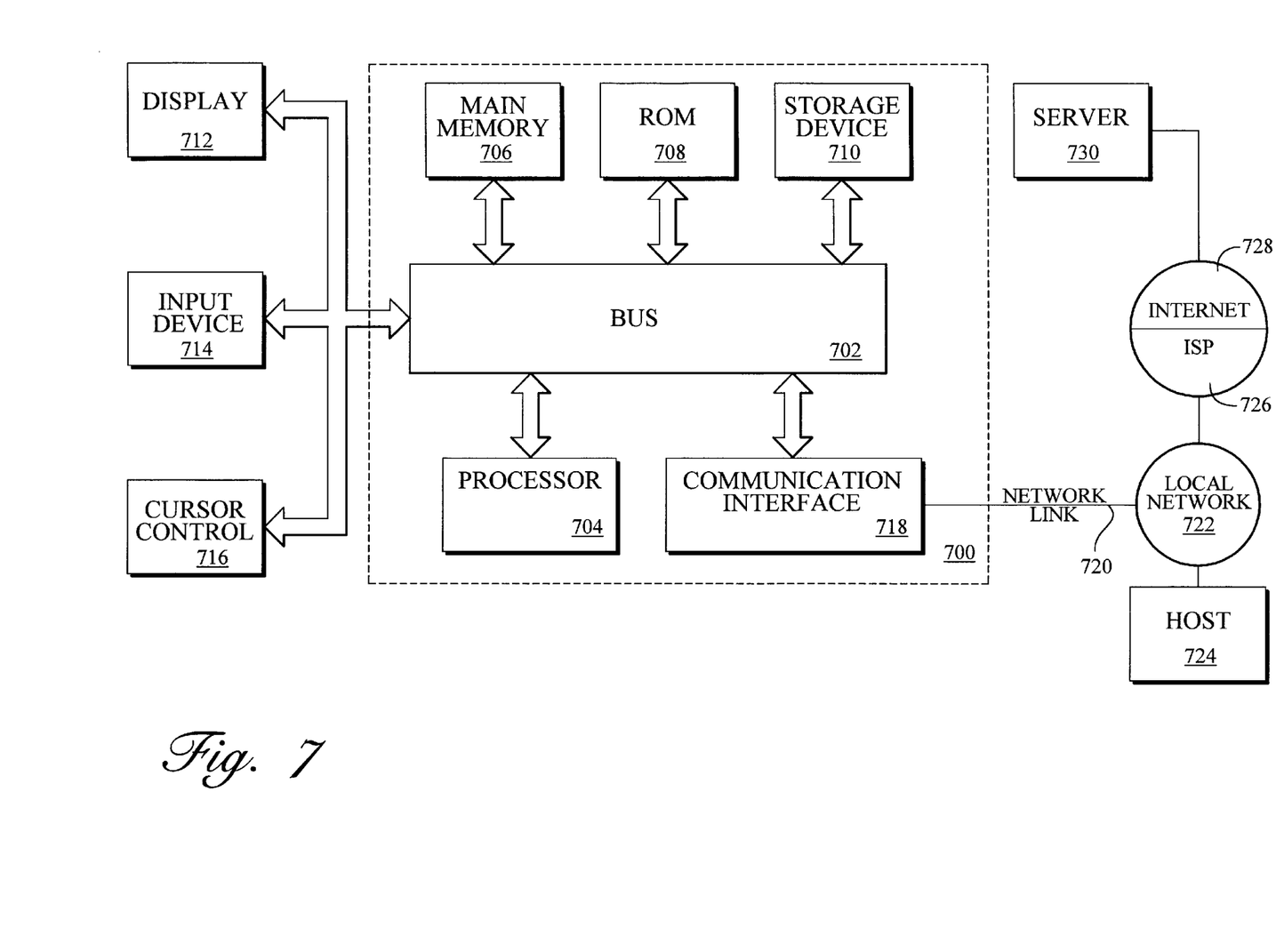
FIG. 7 is a hardware block diagram of a computer system in which an embodiment of the present invention may be implemented.

In one embodiment, the present invention is implemented as a set of instructions executable by one or more processors. The invention may be implemented as part of any object oriented programming system, including but not limited to the Java™ programming system manufactured by Sun Microsystems, Inc. of Mountain View, Calif. FIG. 7 shows a hardware block diagram of a computer system 700 in which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. In addition to being used to store class and object instance information, main memory 706 may also be further used to store temporary variables or other intermediate information during execution of instructions by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

According to one embodiment, the functionality of the present invention is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 1 0 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 100 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for performing dynamic method dispatch, comprising:

detecting an invocation of a method m on a target object of class X, said invocation having associated therewith a resolved method and a resolved class, wherein said resolved method is private to a particular modularity construct;

determining a class hierarchy between said resolved class and said class X, said class hierarchy comprising one or more intervening classes;

determining whether at least one of said intervening classes has publicized said resolved method; and in response to a determination that an intervening class has publicized said resolved method, performing standard method lookup to invoke a proper implementation for said method m.

2. The method of claim 1, wherein performing standard method lookup comprises:

determining whether said class X provides an implementation for said method m; and in response to a determination that said class X provides an implementation for said method m, invoking said implementation.

3. The method of claim 2, wherein performing standard method lookup further comprises:

in response to a determination that said class X does not provide an implementation for said method m, proceeding to a superclass of said class X;

determining whether said superclass provides an implementation for said method m; and in response to a determination that said superclass provides an implementation for said method m, invoking said implementation.

4. The method of claim 1, wherein determining said class hierarchy comprises:

constructing a path stack which comprises all intervening classes between said class X and said resolved class.

5. The method of claim 4, wherein said path stack comprises said class X, wherein said class X is situated at the bottom of said path stack, and wherein said path stack is popped from the top.

6. The method of claim 1, wherein determining whether at least one of said intervening classes has publicized said resolved method comprises:

selecting an intervening class;

determining whether said intervening class provides an implementation for said method m;

determining whether said intervening class can access said resolved method; and determining whether said intervening class has declared said method m as not being private to any modularity construct.

7. The method of claim 6, wherein determining whether said intervening class can access said resolved method comprises:
  determining whether said intervening class is within said same particular modularity construct as said resolved class.

8. The method of claim 7, wherein said method m in said intervening class is considered to have been declared as not being private to any modularity construct if it is designated as being either public or protected.

9. The method of claim 6, further comprising:
  in response to a determination that said intervening class provides an implementation for said method m, and that said intervening class can access said resolve method, but that said intervening class has not declared said method m as not being private to any modularity construct, designating said implementation as a current candidate implementation for said method m.

10. The method of claim 9, further comprising:
  determining whether any other intervening class provides an implementation for said method m which overrides said current candidate implementation; and
  in response to a determination that no other intervening class provides an implementation for said method m which overrides said current candidate implementation, invoking said current candidate implementation.

11. An apparatus for performing dynamic method dispatch, comprising:
  a mechanism for detecting an invocation of a method m on a target object of class X, said invocation having associated therewith a resolved method and a resolved class, wherein said resolved method is private to a particular modularity construct;
  a mechanism for determining a class hierarchy between said resolved class and said class X, said class hierarchy comprising one or more intervening classes;
  a mechanism for determining whether at least one of said intervening classes has publicized said resolved method; and
  a mechanism for performing, in response to a determination that an intervening class has publicized said resolved method, standard method lookup to invoke a proper implementation for said method m.

12. The apparatus of claim 11, wherein said mechanism for performing standard method lookup comprises:
  a mechanism for determining whether said class X provides an implementation for said method m; and
  a mechanism for invoking, in response to a determination that said class X provides an implementation for said method m, said implementation.

13. The apparatus of claim 12, wherein said mechanism for performing standard method lookup further comprises:
  a mechanism for proceeding, in response to a determination that said class X does not provide an implementation for said method m, to a superclass of said class X;
  a mechanism for determining whether said superclass provides an implementation for said method m; and
  a mechanism for invoking, in response to a determination that said superclass provides an implementation for said method m, said implementation.

14. The apparatus of claim 11, wherein said mechanism for determining said class hierarchy comprises:
  a mechanism for constructing a path stack which comprises all intervening classes between said class X and said resolved class.

15. The apparatus of claim 14, wherein said path stack comprises said class X, wherein said class X is situated at the bottom of said path stack, and wherein said path stack is popped from the top.

16. The apparatus of claim 11, wherein said mechanism for determining whether at least one of said intervening classes has publicized said resolved method comprises:
  a mechanism for selecting an intervening class;
  a mechanism for determining whether said intervening class provides an implementation for said method m;
  a mechanism for determining whether said intervening class can access said resolved method; and
  a mechanism for determining whether said intervening class has declared said method m as not being private to any modularity construct.

17. The apparatus of claim 16, wherein said mechanism for determining whether said intervening class can access said resolved method comprises:
  a mechanism for determining whether said intervening class is within said same particular modularity construct as said resolved class.

18. The apparatus of claim 17, wherein said method m in said intervening class is considered to have been declared as not being private to any modularity construct if it is designated as being either public or protected.

19. The apparatus of claim 16, further comprising:
  a mechanism for designating, in response to a determination that said intervening class provides an implementation for said method m, and that said intervening class can access said resolve method, but that said intervening class has not declared said method in as not being private to any modularity construct, said implementation as a current candidate implementation for said method m.

20. The apparatus of claim 19, further comprising:
  a mechanism for determining whether any other intervening class provides an implementation for said method m which overrides said current candidate implementation; and
  a mechanism for invoking, in response to a determination that no other intervening class provides an implementation for said method m which overrides said current candidate implementation, said current candidate implementation.

21. A computer readable medium having stored thereon instructions which, when executed by one or more processors, cause the one or more processors to perform dynamic method dispatch, said computer readable medium comprising:
  instructions for causing one or more processors to detect an invocation of a method m on a target object of class X, said invocation having associated therewith a resolved method and a resolved class, wherein said resolved method is private to a particular modularity construct;
  instructions for causing one or more processors to determine a class hierarchy between said resolved class and said class X, said class hierarchy comprising one or more intervening classes;
  instructions for causing one or more processors to determine whether at least one of said intervening classes has publicized said resolved method; and
  instructions for causing one or more processors to perform, in response to a determination that an intervening class has publicized said resolved method, standard method lookup to invoke a proper implementation for said method m.

22. The computer readable medium of claim 21, wherein said instructions for causing one or more processors to perform standard method lookup comprises:

instructions for causing one or more processors to determine whether said class X provides an implementation for said method m; and instructions for causing one or more processors to invoke, in response to a determination that said class X provides an implementation for said method m, said implementation.

23. The computer readable medium of claim 22, wherein said instructions for causing one or more processors to performing standard method lookup further comprises:

instructions for causing one or more processors to proceed, in response to a determination that said class X does not provide an implementation for said method m, to a superclass of said class X;

instructions for causing one or more processors to determine whether said superclass provides an implementation for said method m; and instructions for causing one or more processors to invoke, in response to a determination that said superclass provides an implementation for said method m, said implementation.

24. The computer readable medium of claim 21, wherein said instructions for causing one or more processors to determine said class hierarchy comprises:

instructions for causing one or more processors to construct a path stack which comprises all intervening classes between said class X and said resolved class.

25. The computer readable medium of claim 24, wherein said path stack comprises said class X, wherein said class X is situated at the bottom of said path stack, and wherein said path stack is popped from the top.

26. The computer readable medium of claim 21, wherein said instructions for causing one or more processors to determine whether at least one of said intervening classes has publicized said resolved method comprises:

instructions for causing one or more processors to select an intervening class;

instructions for causing one or more processors to determine whether said intervening class provides an implementation for said method m;

instructions for causing one or more processors to determine whether said intervening class can access said resolved method; and instructions for causing one or more processors to determine whether said intervening class has declared said method m as not being private to any modularity construct.

27. The computer readable medium of claim 26, wherein said instructions for causing one or more processors to determine whether said intervening class can access said resolved method comprises:

instructions for causing one or more processors to determine whether said intervening class is within said same particular modularity construct as said resolved class.

28. The computer readable medium of claim 27, wherein said method m in said intervening class is considered to have been declared as not being private to any modularity construct if it is designated as being either public or protected.

29. The computer readable medium of claim 26, further comprising:

instructions for causing one or more processors to designate, in response to a determination that said intervening class provides an implementation for said method m, and that said intervening class can access said resolve method, but that said intervening class has not declared said method m as not being private to any modularity construct, said implementation as a current candidate implementation for said method m.

30. The computer readable medium of claim 29, further comprising:

instructions for causing one or more processors to determine whether any other intervening class provides an implementation for said method m which overrides said current candidate implementation; and instructions for causing one or more processors to invoke, in response to a determination that no other intervening class provides an implementation for said method m which overrides said current candidate implementation, said current candidate implementation.

* * * * *